United States Patent
Mohan et al.

(10) Patent No.: US 10,277,727 B2
(45) Date of Patent: Apr. 30, 2019

(54) DISTRIBUTED NETWORK OF A STRUCTURE THAT PROVIDES LOCATION-BASED HUMAN INTERACTION AND INTELLIGENCE

(71) Applicant: enLighted, Inc., Sunnyvale, CA (US)

(72) Inventors: Tanuj Mohan, Mountain View, CA (US); Vijayalakshmi Krishnamurthy, Sunnyvale, CA (US)

(73) Assignee: Enlighted, Inc., Sunnyvale, CA (US)

( * ) Notice: Subject to any disclaimer, the term of this patent is extended or adjusted under 35 U.S.C. 154(b) by 715 days.

(21) Appl. No.: 14/658,154

(22) Filed: Mar. 14, 2015

(65) Prior Publication Data
US 2015/0189068 A1 Jul. 2, 2015

Related U.S. Application Data

(63) Continuation-in-part of application No. 13/930,009, filed on Jun. 28, 2013, now abandoned, which is a
(Continued)

(51) Int. Cl.
*H05B 33/00* (2006.01)
*H04M 1/725* (2006.01)
(Continued)

(52) U.S. Cl.
CPC ...... *H04M 1/72533* (2013.01); *H04L 67/125* (2013.01); *H04W 4/025* (2013.01);
(Continued)

(58) Field of Classification Search
CPC ............... H05B 37/02; H05B 37/0272; H05B 37/0245; Y10S 362/802; Y02B 20/44;
(Continued)

(56) References Cited

U.S. PATENT DOCUMENTS

| 5,101,141 A | 3/1992 | Warner et al. |
| 5,179,324 A | 1/1993 | Audbert |

(Continued)

FOREIGN PATENT DOCUMENTS

| EP | 2320685 A1 * | 5/2011 | ............. H04W 4/90 |
| EP | 2320685 | 3/2014 | |
| WO | WO 2014-124405 | 8/2014 | |

OTHER PUBLICATIONS

Notification of Transmittal of the International Search Report and the Written Opinion of the International Searching Authority, dated Jul. 1, 2016, PCT/US2016/021872.

*Primary Examiner* — Monica C King

(57) ABSTRACT

An apparatuses, methods, and systems for a distributed network of a structure that provides location-based human interaction and intelligent use of the structure are disclosed. The distributed network includes wireless transceivers, sensors, asset tags, and a controller electronically connected to the wireless transceivers, the sensors and the asset tags. At least one wireless transceiver is operative to transmit time-based tokens through a low-power first network, wherein the low-power first network includes the plurality of wireless transceivers. The controller is operative to receive modified time-based tokens from a mobile device or at least one of the plurality of asset tags through a second network, wherein the modified time-based tokens include identification information of the mobile device or the at least one asset tag that has been appended to the time-base tokens, and perform location-based intelligence based on the identification information and the time-based tokens.

14 Claims, 13 Drawing Sheets

Related U.S. Application Data continuation of application No. 12/849,081, filed on Aug. 3, 2010, now Pat. No. 8,508,149.

(51) Int. Cl.
| | | |
|---|---|---|
| *H04W 4/02* | (2018.01) | |
| *H04L 29/08* | (2006.01) | |
| *H05B 37/02* | (2006.01) | |
| *H05B 33/08* | (2006.01) | |

(52) U.S. Cl.
CPC ..... *H05B 33/0854* (2013.01); *H05B 37/0227* (2013.01); *H05B 37/0236* (2013.01); *H05B 37/0272* (2013.01); *Y02B 20/383* (2013.01); *Y02B 20/48* (2013.01); *Y02D 70/00* (2018.01); *Y02D 70/142* (2018.01); *Y02D 70/144* (2018.01); *Y02D 70/162* (2018.01); *Y02D 70/166* (2018.01); *Y10T 29/49716* (2015.01)

(58) Field of Classification Search
CPC .... Y02B 60/50; H04B 5/0062; H04B 10/116; H04B 10/1149; H04B 10/50; H04W 84/18; H04W 84/12
USPC .......................................... 362/276; 700/296
See application file for complete search history.

(56) References Cited

U.S. PATENT DOCUMENTS

| | | | |
|---|---|---|---|
| 5,191,265 | A | 3/1993 | D'Aleo et al. |
| 5,283,516 | A | 2/1994 | Lohoff |
| 5,812,422 | A | 9/1998 | Lyons |
| 6,057,654 | A | 5/2000 | Cousy et al. |
| 6,188,181 | B1 | 2/2001 | Sinha et al. |
| 6,342,994 | B1 | 1/2002 | Cousy et al. |
| 6,548,967 | B1 | 4/2003 | Dowling et al. |
| 6,763,013 | B2 | 7/2004 | Kennedy |
| 7,309,985 | B2 | 12/2007 | Eggers et al. |
| 7,348,736 | B2 | 3/2008 | Piepgras et al. |
| 7,437,596 | B2 | 10/2008 | McFarland |
| 7,382,271 | B2 | 12/2008 | McFarland |
| 7,550,931 | B2 | 6/2009 | Lys et al. |
| 7,566,137 | B2 | 7/2009 | Veskovic |
| 7,623,042 | B2 | 11/2009 | Huizenga |
| 7,792,956 | B2 | 9/2010 | Choong et al. |
| 7,925,384 | B2 | 4/2011 | Huizenga et al. |
| 8,344,660 | B2 | 1/2013 | Mohan et al. |
| 8,457,793 | B2 | 6/2013 | Golding et al. |
| 8,461,778 | B2 | 6/2013 | Mohan et al. |
| 8,493,209 | B2 | 7/2013 | Mohan et al. |
| 8,508,149 | B2 | 8/2013 | Mohan et al. |
| 8,558,466 | B2 | 10/2013 | Basil et al. |
| 8,587,219 | B2 | 11/2013 | Mohan et al. |
| 8,587,225 | B2 | 11/2013 | Ashar et al. |
| 8,787,944 | B2 | 7/2014 | Smith |
| 9,345,115 | B2 | 5/2016 | Mohan |
| 9,585,227 | B2 | 2/2017 | Mohan et al. |
| 2004/0002792 | A1 | 10/2004 | Hoffknecht |
| 2005/0169643 | A1 | 8/2005 | Franklin et al. |
| 2005/0231112 | A1 | 10/2005 | Woo et al. |
| 2005/0278047 | A1 | 12/2005 | Ahmed |
| 2006/0244387 | A1 | 11/2006 | Park et al. |
| 2006/0275040 | A1 | 12/2006 | Franklin |
| 2007/0057807 | A1 | 3/2007 | Walters et al. |
| 2007/0061050 | A1 | 3/2007 | Hoffknecht |
| 2007/0086128 | A1 | 4/2007 | Lane et al. |
| 2007/0215794 | A1 | 9/2007 | Cernasov et al. |
| 2008/0185597 | A1 | 8/2008 | Veskovic et al. |
| 2008/0244104 | A1 | 10/2008 | Clemente |
| 2008/0265796 | A1 | 10/2008 | Null |
| 2009/0026966 | A1 | 1/2009 | Budde et al. |
| 2009/0179596 | A1 | 7/2009 | Willaert et al. |
| 2009/0195161 | A1 | 8/2009 | Lane et al. |
| 2009/0267540 | A1 | 10/2009 | Chemel et al. |
| 2009/0284366 | A1 | 11/2009 | Haarten et al. |
| 2010/0026479 | A1 | 2/2010 | Tran |
| 2010/0034386 | A1 | 2/2010 | Choong et al. |
| 2010/0135186 | A1 | 6/2010 | Choong et al. |
| 2010/0144314 | A1* | 6/2010 | Sherkin .................. G06F 21/33 455/411 |
| 2010/0264846 | A1 | 10/2010 | Chemal et al. |
| 2010/0270933 | A1 | 10/2010 | Chemal et al. |
| 2010/0280677 | A1 | 11/2010 | Budike, Jr. |
| 2010/0295482 | A1 | 11/2010 | Chemal et al. |
| 2010/0301777 | A1 | 12/2010 | Chemal et al. |
| 2011/0031897 | A1 | 2/2011 | Henig et al. |
| 2011/0199010 | A1 | 8/2011 | Henig et al. |
| 2012/0108294 | A1 | 5/2012 | Kaul |
| 2012/0316414 | A1 | 12/2012 | Greene |
| 2013/0052946 | A1* | 2/2013 | Chatterjee ............... H04W 4/80 455/41.1 |
| 2013/0141554 | A1 | 6/2013 | Ganick et al. |
| 2013/0278389 | A1* | 10/2013 | Cristache ........... G06K 7/10366 340/10.1 |
| 2013/0285558 | A1 | 10/2013 | Recker et al. |
| 2014/0187200 | A1 | 7/2014 | Reitter et al. |
| 2014/0266585 | A1* | 9/2014 | Chao .................. G07C 9/00111 340/5.61 |
| 2015/0043425 | A1* | 2/2015 | Aggarwal ............... H04W 4/70 370/328 |
| 2015/0103776 | A1* | 4/2015 | Luther ................ H04W 76/021 370/329 |
| 2016/0122157 | A1 | 5/2016 | Keser |
| 2016/0142877 | A1 | 5/2016 | Gural et al. |

* cited by examiner

_US 10,277,727 B2_

DISTRIBUTED NETWORK OF A STRUCTURE THAT PROVIDES LOCATION-BASED HUMAN INTERACTION AND INTELLIGENCE

RELATED APPLICATIONS

This patent application is a continuation-in-part (CIP) of U.S. patent application Ser. No. 13/930,009, filed Jun. 28, 2013, which is a continuation patent application of U.S. patent application Ser. No. 12/849,081, filed Aug. 3, 2010, and granted as U.S. Pat. No. 8,508,149, all of which are herein incorporated by reference.

FIELD OF THE EMBODIMENTS

The described embodiments relate generally to electronics within a structure. More particularly, the described embodiments relate to a distributed network of a structure that provides location-based human interaction and intelligence.

BACKGROUND

Lighting control of a structure can be used to automatically control lighting under certain conditions, thereby conserving power. However, lighting control, specifically advanced lighting controls have not been widely adopted in the general commercial market because the installation, setup related costs and complexity have made these lighting systems prohibitively expensive for most commercial customers. Additionally, if these systems include intelligence, they are centrally controlled.

Additionally, the management of the resources, control, and security of structures is not intelligent or location aware.

It is desirable to have a lighting method, system and apparatus for distributed network for providing intelligent location-based human interaction and intelligence.

SUMMARY

One embodiment includes a distributed network of a structure. The distributed network includes a plurality of wireless transceivers distributed about the structure, a plurality of sensors distributed about the structure, and a controller electronically connected to the plurality of wireless transceivers, and the plurality of sensors. The plurality of wireless transceiver is operative to transmit time-based (varying) tokens through a low-power first network, wherein the low-power first network includes the plurality of wireless transceivers. A controller is operative to receive modified time-based tokens from a mobile device through a second network, wherein the modified time-based tokens include identification information of the mobile device that has been appended to the time-base tokens, and perform location-based intelligence based on the identification information and the time-based tokens.

Another embodiment includes a distributed network of a structure. The distributed network includes a plurality of wireless transceivers distributed about the structure, a plurality of sensors distributed about the structure, and at least one controller of the plurality of wireless transceivers electronically connected to at least a subset the plurality of wireless transceivers, and the plurality of sensors. The plurality of transceivers is operative to transmit time-based tokens through a low-power first network, wherein the low-power first network includes the plurality of wireless transceivers. The at least one controller is operative to receive modified time-based tokens from a mobile device through a second network, wherein the modified time-based tokens include identification information of the mobile device or the at least one asset tag that has been appended to the time-base tokens, and perform location-based intelligence based on the identification information and the time-based tokens.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in apparatuses and methods for a distributed network of a structure that provides location-based human interaction and intelligent use of the structure.

Figure 1:
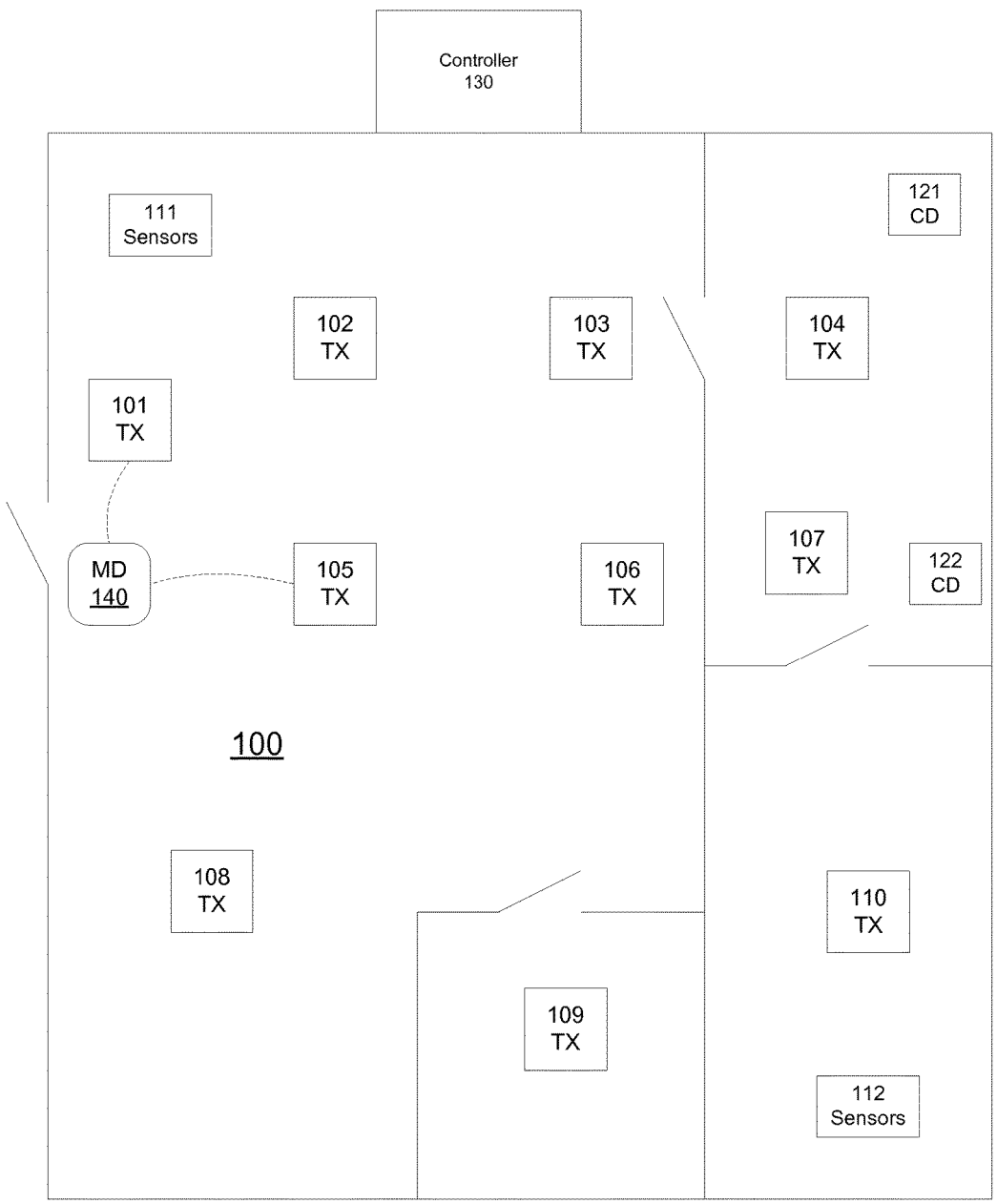
FIG. 1 shows a distributed network of a structure, according to an embodiment.

FIG. 1 shows a distributed network of a structure 100, according to an embodiment. As shown, a structure 100 includes wireless transceivers 101-110 that are distributed throughout the structure 100. While the structure 100 of FIG. 1 illustrates a building, it is to be understood that the structure is not to be limited as such. For example, the structure 100 can include a parking lot, a stadium, a storage facility, etc.

Further, as shown, for at least some embodiments the structure further includes sensor devices 111, 112. The sensors 111, 112 are operative to sense conditions within the structure 100. For an embodiment, the sensors 111, 112 are operative to sense at least one of motion, light, sound, temperature, humidity, and/or vibration within the structure. It is to be understood that the listed sensor types are by example, and that any other type of sensors can additionally or alternatively be utilized. While FIG. 1 only shows two sensors 111, 112, it is to be understood that the structure can include any number and any type of sensor.

For at least some embodiments, the structure 100 includes controlled devices 121, 122. For an embodiment, the controlled devices 121, 122 devices include appliances (also referred to as asset tags), such as, printers, coffee makers, refrigerators, copiers, fax machines, etc. The controlled devices 121, 122 can be controlled, and status information of the controlled devices 121, 122 can be checked. While FIG. 1 only shows two controlled devices 121, 122, it is to be understood that the structure can include any number and any type of controlled device.

For at least some embodiments, the sensors 111, 112 and/or the controlled devices 121, 122 are electronically coupled to one or more of the wireless transceivers 101-110. For at least some embodiments, the sensors 111, 112 and/or the controlled devices 121, 122 are wirelessly coupled to one or more of the wireless transceivers 101-110, thereby allowing control information to be sent to the sensors 111, 112 and/or the controlled devices 121, 122, and sensor or device information to be retrieved from the sensors 111, 112 and/or the controlled devices 121, 122.

Further, for at least some embodiments, as will be shown and described, a lighting fixture includes at least one of the sensors (such as, sensor 111), and at least one of the transceivers (such as, transceiver 102). Further, for at least some embodiments, the lighting fixture includes at least a portion of the controller 130.

For an embodiment, the transceivers 101-110 are electronically connected to a controller 130. The controller 130 is operable to receive information from any of the wireless transceivers 101-110, the sensors 111, 112, and/or the controlled devices 121, 122. Further, the controller 130 is operative to store the received information. Further, the controller 130 is operative to provide location-based human interaction and intelligence based on the received information and the stored information.

While the controller 130 is depicted as a single standalone controller, it is to be understood that the control of the distributed network can include many distributed controllers. For an embodiment, the network control is distributed amongst at least the wireless transceivers 101-110 (which can be included within a light fixture). Distributed networks are more resilient to failure of portions of the network. For at least some embodiments, the communication links between the wireless transceivers 101-110 and the controller 130 includes one or more wireless communication links.

For at least some embodiments, the wireless transceivers 101-110 are low-power transceivers. That is, the transmission signals of the wireless transceivers 101-110 are low-power, and therefore, have a limited range. For at least some embodiments, the transmission power is limited to be less than a threshold, thereby ensuring that all devices receiving the transmission signals are within a threshold distance of the transmitting transceiver. Therefore, a mobile device 140 of a user within the structure can only communicate with one or more of the wireless transceivers 101-110 that are proximate enough to maintain a communication link. Due to the proximity of the mobile device 140 to the transceiver that the mobile device 140 is communicating with, a location of the mobile device 140 can be estimated. Additionally, the sensors 111, 112 of the structure 100 are operative to determine occupancy and motion of the user of the mobile device within the structure 100.

For at least some embodiments, the sensors 111, 112, and/or sensors associated with anyone of the wireless transceivers 101-110 sense motion and/or occupancy within the structure 100. Further, the sensors 111, 112, and/or sensors associated with anyone of the wireless transceivers 101-110 are utilized to sense motion of occupants within the structure 100.

For an embodiment, the mobile device 140 is operative to couple to the controller 130 through the wireless transceivers 101-110. For an embodiment, the downstream communication from the controller 130 to the mobile device is through the low-power or first network (such as, but not limited to, Bluetooth, Zigbee, or IEEE 802.15.4). For an embodiment, the upstream communication from the mobile device 140 to the controller 130 is through a second network (such as a WiFi network) that includes the wireless transceivers 101-110. That is, for an embodiment, the wireless transceivers 101-110 include both the first network and the second network that support downstream and upstream communication between the controller 130 and the mobile device 140. For another embodiment, the upstream communication from the mobile device 140 to the controller 130 is through an external network (such as, a cellular network).

For an embodiment, the wireless transceivers 101-110 are associated with lighting fixtures that additionally include lighting control and sensors.

For at least some embodiments, the described infrastructure is used to sense and identify occupants of the structure. For at least some embodiments, the described infrastructure is used to locate occupants within the structure. For at least some embodiments, the described infrastructure is used to provide real-time updates of identification/location to other occupants and resource allocation systems.

For at least some embodiments, the described infrastructure is used to provide real-time availability of resources of the structure. For at least some embodiments, the described infrastructure is used to provide resource location/availability. For at least some embodiments, the described infrastructure is used to provide real-time updates of resource location/availability to occupants and resource allocation systems. For at least some embodiments, the described infrastructure provides a user of a mobile device access and control to devices and resources (internet of things) within the structure 100.

Figure 2:
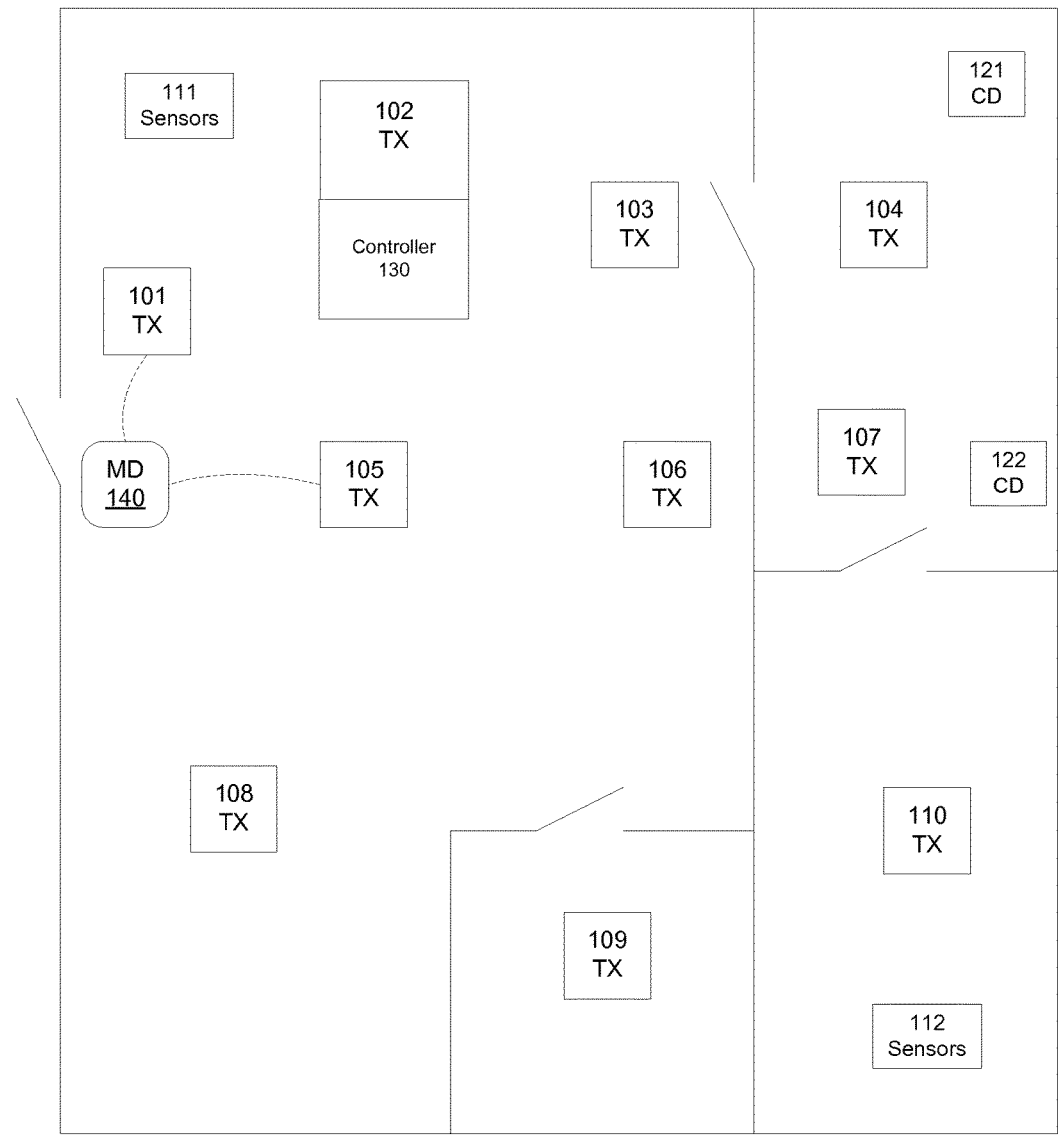
FIG. 2 shows a distributed network of a structure, according to another embodiment.

FIG. 2 shows a distributed network of a structure 100, according to another embodiment. For this embodiment, the controller 130 is included within at least one of the transceivers, such as transceiver 102 (wherein the transceiver 102 can also be included within a light fixture along with at least one of the sensors). While shown in FIG. 2 as being included within a single transceiver, it is to be understood that the processing of the controller 130 can be distributed amongst multiple transceivers, and even one or more controllers external to the transceivers of the structure. The processing of the controller 130 can be located within one or more sensors, in gateway, a separate device and/or a central server/cloud. Further, the controller 130 can include multiple controllers, including, for example, a building management system controller which additionally executes control commands.

Figure 3:
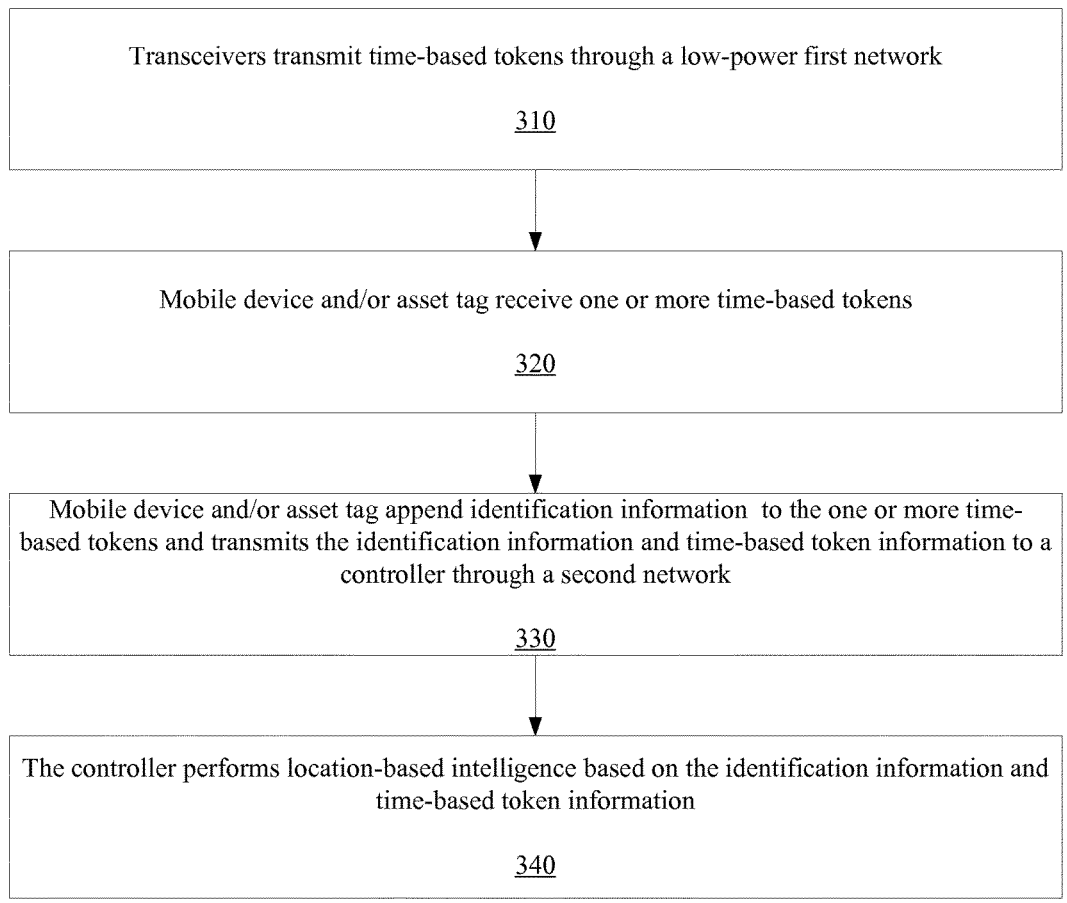
FIG. 3 is a flow chart this includes steps of a method of controlling a distributed network of a structure, according to an embodiment.

FIG. 3 is a flow chart that includes steps of security access and tracking, according to an embodiment. A first step 310 includes a transceiver (such as, transceiver 101) transmitting time-based beacons through a first (low-power) network. The time-based beacons include a timestamp, device identification information and a token that is valid for a period after generation time. A second step 320 includes a mobile device (such as, mobile device 140) receiving the time-based beacon. As previously described, for an embodiment, the transmission signal power of the transceivers is limited to a predetermined level so that only devices within a predetermined proximate range of a transceiver are able to receive the transmission. For an embodiment, the transmissions include the time-based beacons. For an embodiment, the time-based beacons include a door-token, the can be utilized by the mobile device to open, for example, a door of the structure 100. Again, the door-token is transmitted over a low-power (first) network, for example, a Bluetooth wireless network or WiFi.

A third step 330 includes the mobile device appending identification information to the received time-based token information with information related to the mobile device, time of token reception and a new period of validity for the appended token. The mobile device then transmits the identification information and the time-based token information back to a controller through a second network. For an embodiment, the second network includes a cellular network. For an embodiment, the second network includes a WiFi or IEEE 802.11 network associated with the transceiver and/or other transceivers of the distributed network of the structure 100.

A fourth step 340 includes the controller performing location-based intelligence based on the identification information and the time-based token information. For at least some embodiments, the controller tracks the mobile device movements within the building (structure). Further, for at least some embodiments, in real time, the controller verifies if a specific location of the mobile device is acceptable as per an access level assigned to mobile device and its user. If the location is identified to be outside of the access level, the controller sends command to one or more transceivers in the proximity of mobile device to, for example, blink the lights (or any other form of communication) as a warning. Also, the controller sends message to the mobile device with violation information and course of action to be taken by the user. In addition, controller also sends message to configured security authority on violation.

For at least some embodiments, location based intelligence includes identifying location of occupant/asset tag within the structure and providing specific services that are appropriate for the location at that time. Specific services include, but not limited to, a resource map, resource identification, resource status information, controlling of a resource, communication with occupants and/or assets in the proximity a user, and location specific tracking of occupants and/or assets. Examples of assets include, but are not limited to, lab equipment, health care equipment, movable machines, retail products and event tickets of specific type. These assets are equipment with communication tags that enable location identification and access check.

Figure 4:
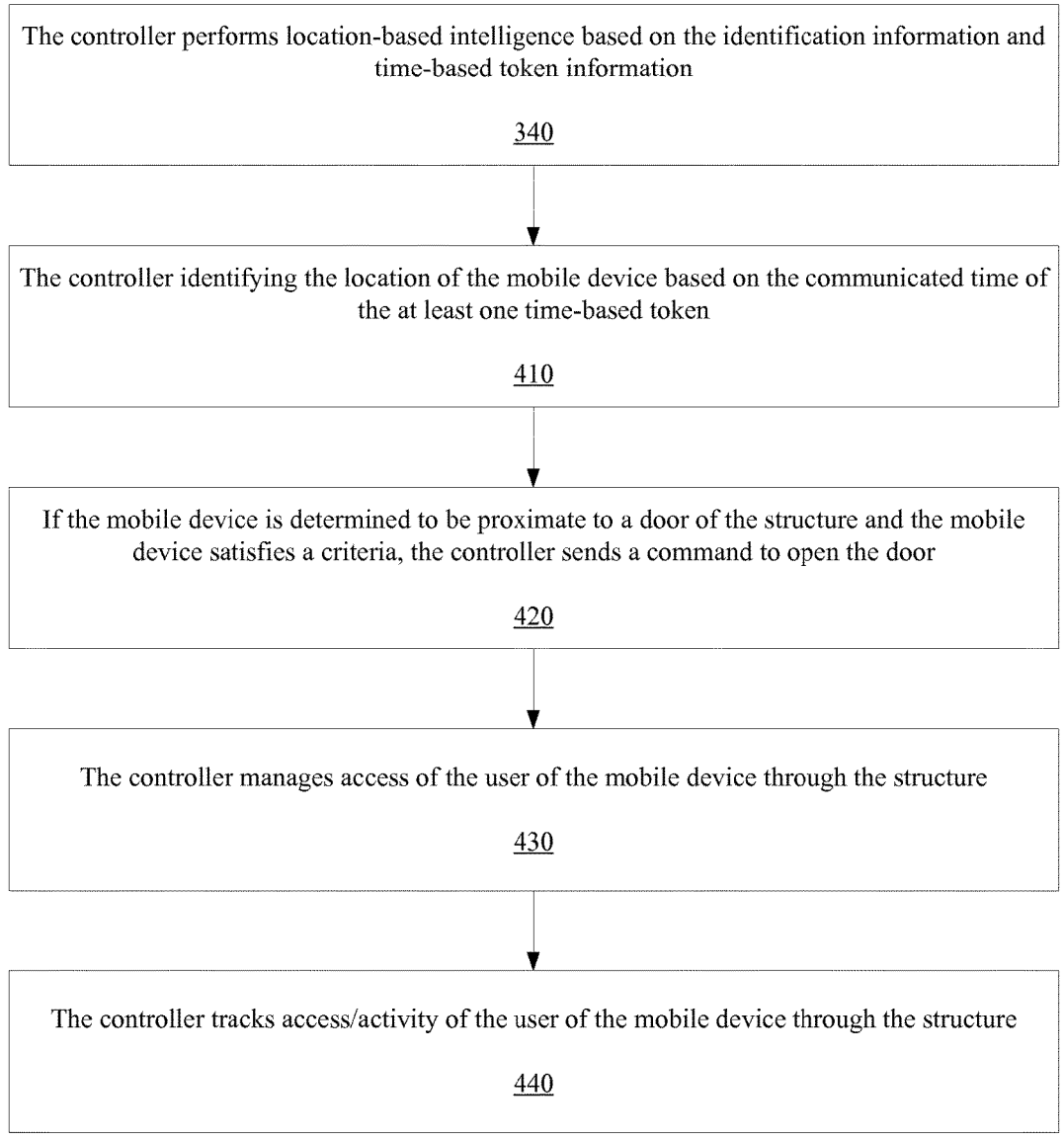
FIG. 4 is a flow chart this includes steps of a method of controlling a distributed network of a structure that includes tracking and access and activities of a user of a mobile device within the structure, according to an embodiment.

FIG. 4 is a flow chart this includes steps of a method of controlling a distributed network of a structure that includes tracking and access and activities of a user of a mobile device within the structure, according to an embodiment. An initial step includes the step 340 of the flow chart of FIG. 3. That is, the controller receives through a second network, identification information and time-based token information.

A first step 410 includes the controller identifying the location of the mobile device based on the communicated time of the at least one time-based token. For an embodiment, the location is estimated based on knowing the location of the transceiver that transmitted the time-based token. That is, because the time-based tokens are transmitted through a low transmission signal power first network, the location of the mobile device can be estimated by knowing the transceiver and the location of the transmitter that transmitted the time-based token. The time element allows for easy determination of when the time-based token was transmitted.

A second step 420 includes the controller sending a command to open the door if the mobile device is determined to be proximate to a door of the structure and the mobile device satisfies a criteria. An embodiment includes communicating a door-open request to the controller wherein the door-opening request is based on the door-token, and is communicated to the server through a second network. For an embodiment, the second network includes a WiFi network of the wireless transceivers (for example, the wireless transceivers 101-110) of the structure. At least some embodiments include the controller communicating with a control device of the structure that is operable to open a door of the structure, thereby allowing a user of the mobile device to enter the structure.

A third step 430 includes the controller managing access of the user of the mobile device through the structure. That is, the location(s) of the mobile user is determined as the user travels or navigates through the structure. Further, the controller can access a data source that includes where the user is to have access, and where the user is not to have access.

A fourth step 440 includes the controller tracking access/activity of the user of the mobile device through the structure. For at least some embodiments, this tracking includes recording of the pathways taken by the mobile user and the resources utilized by the mobile user throughout the structure.

Figure 5:
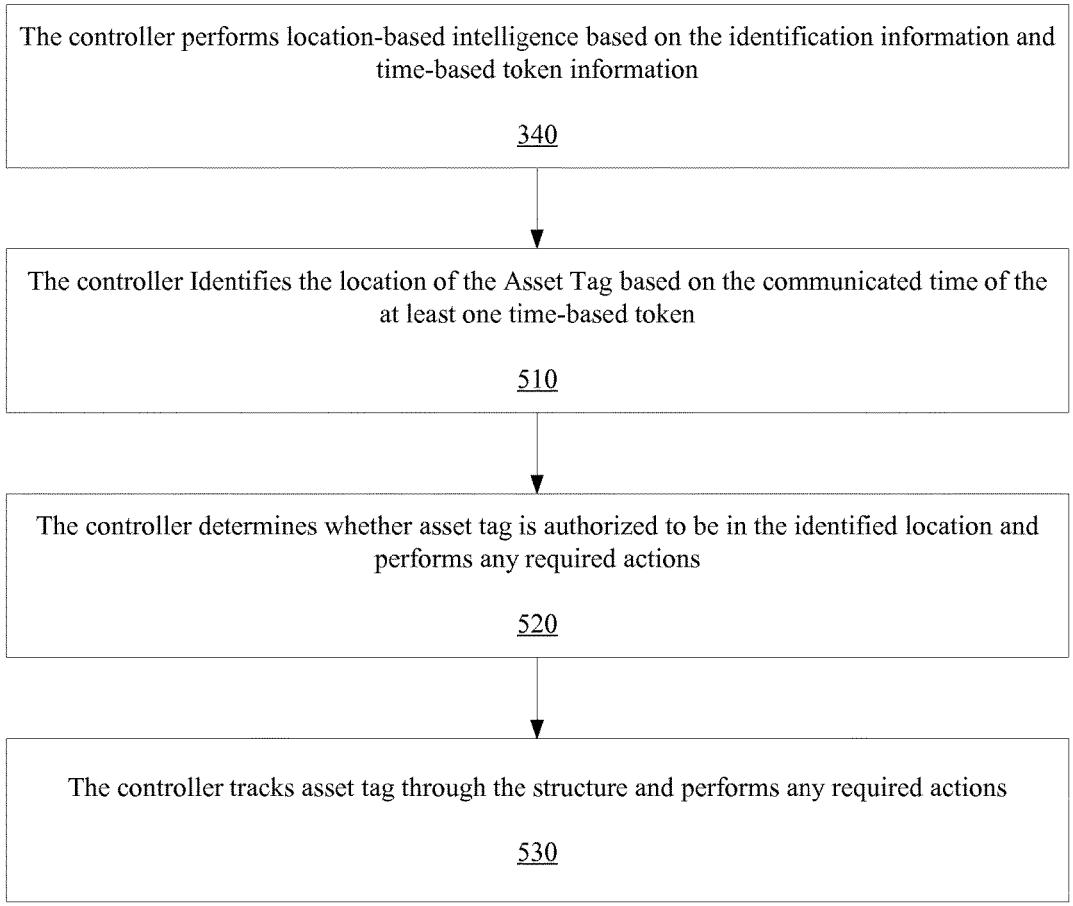
FIG. 5 is a flow chart this includes steps of a method of controlling a distributed network of a structure that includes tracking an asset tag within the structure, according to an embodiment.

FIG. 5 is a flow chart this includes steps of a method of controlling a distributed network of a structure that includes tracking an asset tag within the structure, according to an embodiment. An initial step is similar to the step 340 of the flow chart of FIG. 3, wherein an asset tag (rather than a mobile device) receives the time-based beacon, appends identification information to the received time-based token information, and then transmits the identification information and the time-based token information back to a controller through a second network.

A first step 510 includes the controller identifying the location of the asset tag based on the communicated time of the at least one time-based token. A second step 520 includes the controller determining whether asset tag is authorized to be in the identified location and performs any required actions. A third step 530 includes the controller tracking asset tag through the structure and performing any required actions.

For at least some embodiments, if the asset is not authorized to be at the identified location, the controller communicates with building management system on the violation, thereby allowing the building management system to take necessary action. In addition, for at least some embodiments, the controller communicates to configured facility and asset management personnel on violation with identified location.

For at least some embodiments, tracking of an asset includes, but is not limited to, historical and current location of assets within the structure, historical and current utilization of the asset and this information contextualized with other relevant structure specific information (meta data). Examples of meta data include a name of the space, conditions under which asset is used or moved and potentially the users/movers of the assets.

Figure 6:
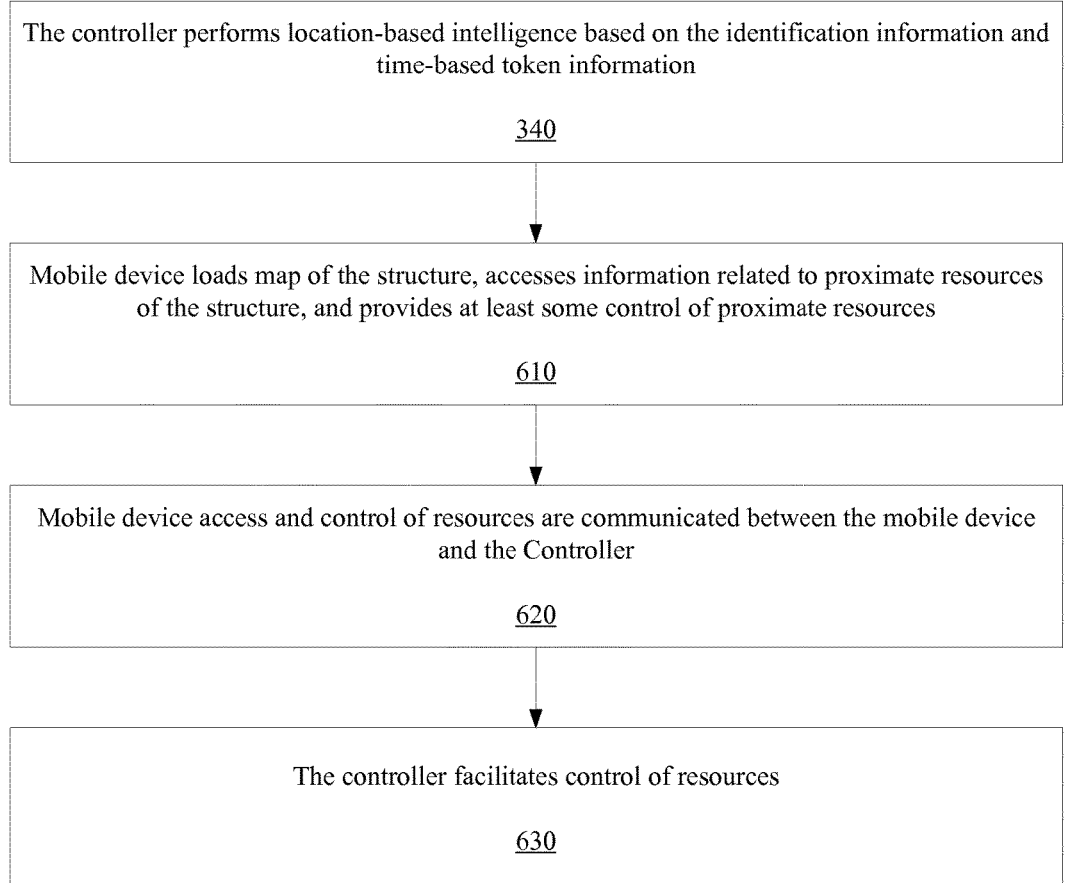
FIG. 6 is a flow chart this includes steps of a method of controlling a distributed network of a structure that facilitates mobile device access and control of resources of the structure, according to an embodiment.

FIG. 6 is a flow chart this includes steps of a method of controlling a distributed network of a structure that facilitates mobile device access and control of resources of the structure, according to an embodiment. An initial step includes the step 340 of the flow chart of FIG. 3. A first step 610 includes the mobile device loading a map of the structure, accessing information related to proximate resources of the structure, and providing at least some control of proximate resources. A second step 620 includes the mobile device access and control of resources is communicated between the mobile device and the controller. A third step 630 includes the controller facilitating control of resources.

For at least some embodiments, the type of resources are wide ranging, and include, for example, conference rooms, hoteling spaces, printers/copiers, lab equipment, coffee machines, cafeteria, phone rooms etc. Access and control of specific configured resource is enabled by the communication between the mobile device, the server and the transceivers in the proximity of mobile devices. In the cases where the specific resource is configured to communicate with building management system, the server facilitates the additional communication needed to execute the access and control of resource. In some cases, given specific configuration of resources, the mobile device will be able to communicate and control resources via low power network such as Bluetooth or WiFi.

Figure 7:
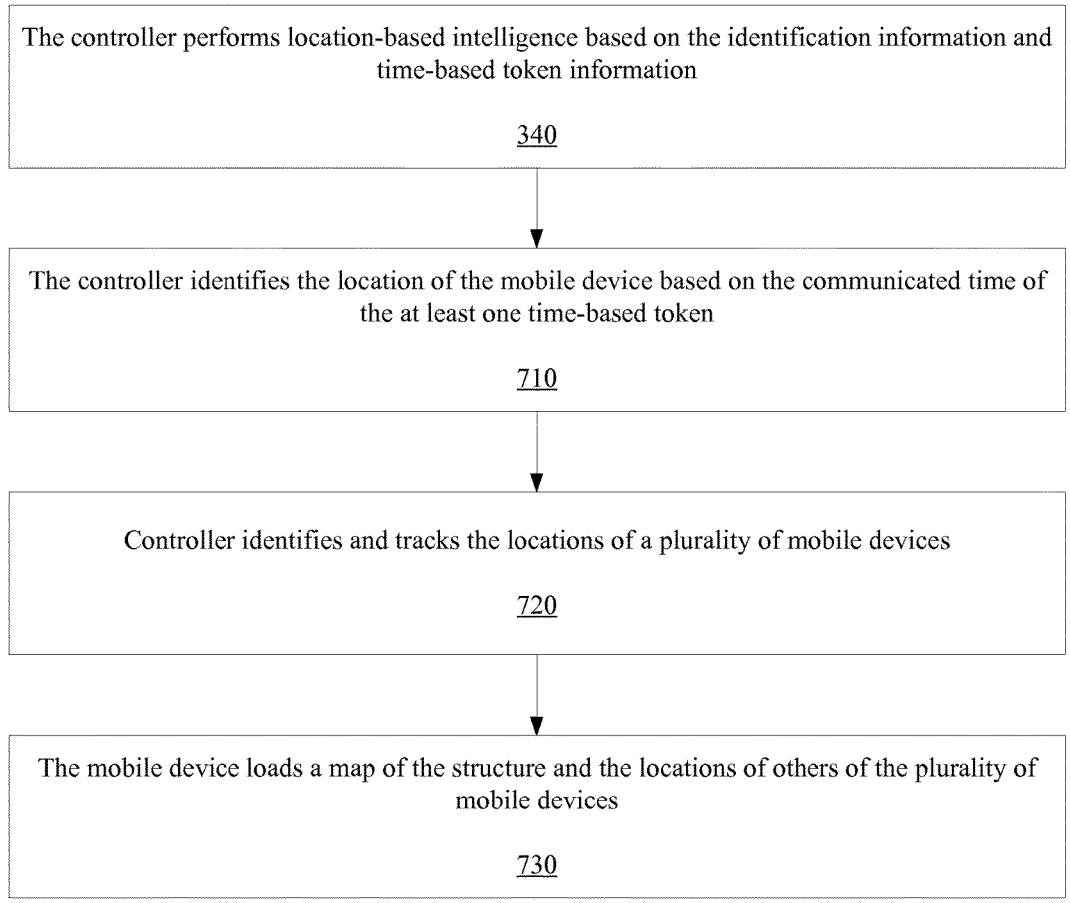
FIG. 7 is a flow chart this includes steps of a method of controlling a distributed network of a structure that facilitates mobile device access and control of resources of the structure, according to an embodiment.

FIG. 7 is a flow chart this includes steps of a method of controlling a distributed network of a structure that facilitates mobile device access and control of resources of the structure, according to an embodiment. An initial step includes the step 340 of the flow chart of FIG. 3. A first step 710 includes the controller identifying the location of the mobile device based on the communicated (transmit) time of the at least one time-based token. A second step 720 includes the controller identifying and tracking the locations of a plurality of mobile devices (including the mobile device). A third step 730 includes the mobile device loading a map of the structure and the locations of others of the plurality of mobile devices.

During emergency, if one or a group of the mobile devices is identified to be in the proximity of danger, the controller communicates course of action messages for the group of mobile devices for them to coordinate as a group to escape danger. The controller also sends the location and other relevant information on the user of mobile devices to facility and emergency management personnel.

For at least some embodiments, information of a plurality of mobile devices enables resource to occupant balancing actions in structures such as stadiums, retail environments and enterprise hoteling spaces. In addition, information of a plurality of mobile devices enable service improvement actions in structures such as cafeteria, retail environments etc. For at least some embodiments, actions that maximize service level and/or user experience is provided via software applications that use the location of plurality of mobile devices.

For at least some embodiments, information of a plurality of other mobile devices in proximity of a user of the mobile device is used to establish location aware enterprise social network. This social network enables individual occupant to instantaneously communicate with other occupants who are part of the network. Software applications that use this location of plurality of mobile devices enable real time communication that helps to achieve higher productivity.

In structures such as enterprise workplace environments, location of plurality of mobile devices enable real time communication to specific set of mobile users with location specific activities that could improve their knowledge, participation towards enterprise goals and thereby improving their contribution to company's vision. In structures such as stadium or retail environments, location of plurality of mobile devices enable delivering user group size specific services such as dispatch of service attendants for the group and delivering user specific services for subset of users such as proximate product/resource information.

For an embodiment, one or more of the sensor 111, 112 include acoustic sensors, such as, a microphone. The one or more microphones sense proximate sound. For an embodiment, the one or more microphones provide the sensed sound to the controller 130. For an embodiment, the controller tracks the sensed sound over time. Further, for an embodiment, the sensed sound is recorded over time, allowing for the determination of a base-line level of sound or characteristic of sound, which can be identified as a normal sound characteristic for the structure (at least proximate to the one or more acoustic sensors).

Further, for an embodiment, the sensed sound recorded over time is compared to later sensed sound. The comparison can be used to determine anomalies, suggesting an occurrence an atypical event. For example, an atypical event, such as, a fall of an occupant, a water leak, equipment not operating correctly, the presence of machinery in an unexpected place, sound (decibel) levels below or above expected thresholds, can exhibit sound that is difference from the baseline of "normal" operations and activities within the structure (proximate to the one or more acoustic sensors). Therefore, comparison of the base-line sound with the atypical event can be used to identify the occurrence of the atypical event.

For an embodiment, the controller is operative to receive sound sensed by the acoustic sensor, matched the sensed sound with at least one of a plurality of predetermined sounds, and execute a predetermine action based on matching of the sound with the at least one of a plurality of predetermined sounds.

Further, for an embodiment, once an atypical or anomaly event has been detected, an action is initiated. For at least some embodiments, the action includes communicating an action to a device within the structure. For example, the identification of an atypical or anomaly event can be used to initiate a visual sensor within the structure. Further, warnings can be communicated to particular users, or user devices.

Figure 8:
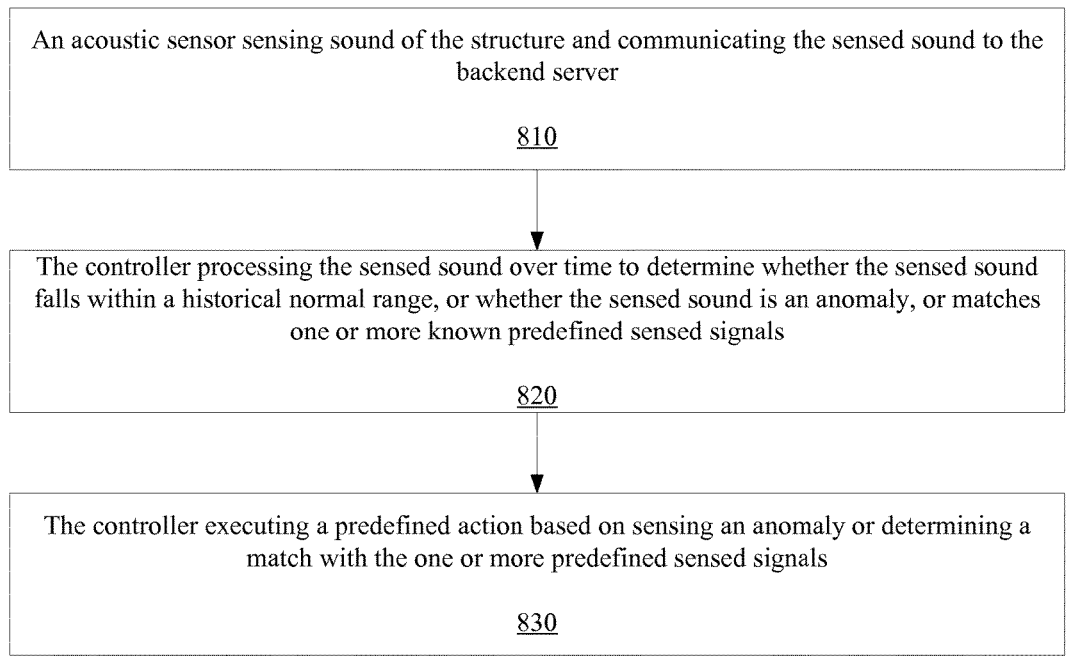
FIG. 8 is a flow chart that includes steps of a method of detecting anomalies of a structure, and responding to the detected anomalies.

FIG. 8 is a flow chart that includes steps of a method of detecting anomalies of a structure, and responding to the detected anomalies, according to an embodiment. A first step 810 includes an acoustic sensor sensing sound of the structure and communicating the sensed sound to the controller. A second step 820 includes the controller processing the sensed sound over time to determine whether the sensed sound falls within a historical normal range, or whether the sensed sound is an anomaly, or matches one or more known predefined sensed signals. A third step 830 includes the controller executing a predefined action based on sensing an anomaly or determining a match with the one or more predefined sensed signals. Such predefined action can include, for example, communicating to one or more of the transceivers and or sensors to commence visual signaling within the structure. Additionally, or alternatively, the predefined action includes communicating with one or more mobile devices associated with the structure.

For an embodiment, the acoustic sensor includes a microphone located in at least one of the transceivers that observes the sound signal and communicates to the controller.

For an embodiment, the controller processes the sound signal from each time point with historical signal to determine the change and to decide if the change is anomaly and/or matches with the defined fault signal.

For an embodiment, based on the historical data, controller has the baseline "normal" signal. Controller is provided with specific fault signals (such as fall of the occupant, water leak, equipment not operating correctly, presence of machinery in the unexpected space, decibel levels below or above expected threshold etc.). For each of these fault signals, controller is provided with action to be taken.

For an embodiment, the controller takes predefined action on communication in the case of specific anomaly/fault. The action may include communication to transceivers for visual signaling. The action may also include communicating to specific mobile devices on the occurrence of fault/anomaly.

For an embodiment, the one or more acoustic sensors are utilized to providing voice command capabilities. For example, a predetermined set of voice commands can be identified, and corresponding actions based on the voice commands identified.

Figure 9:
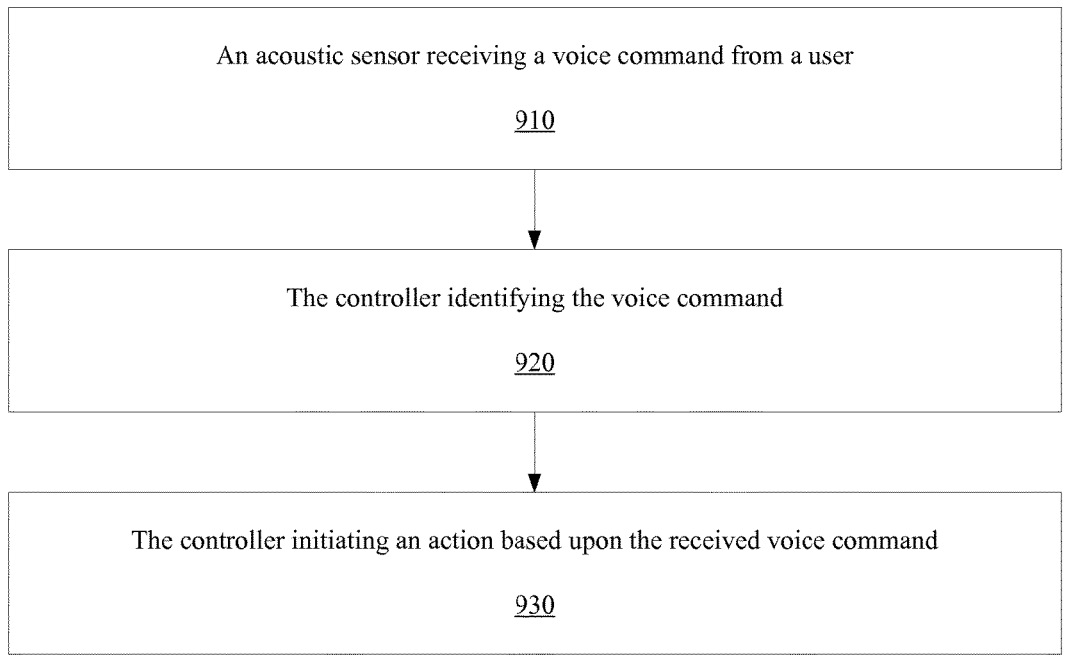
FIG. 9 is a flow chart that includes steps of a method of voice control of resources of a structure, according to an embodiment.

FIG. 9 is a flow chart that includes steps of a method of voice control of resources of a structure, according to an embodiment. A first step 910 includes an acoustic sensor receiving a voice command from a user. A second step 920 includes the controller identifying the voice command. This can be done, for example, by matching the received voice command within at least one of a plurality of predefined voice commands. A third step 930 includes the controller initiating an action based upon the received voice command.

For an embodiment, reception of a voice command by the controller causes the controller to initiate an action. For example, voice commands received by the one or more acoustic sensors and communicated to the controller can include light level control (voice command could include "on", "off", "brighter", "dimmer", etc.), scene control, plug load, temperature control, shades (up, down, in-between). For an embodiment, the voice command can be heard by the resource being controlled via low power network such as Bluetooth and the resource can respond to the command. In this case, the controller records the received command and actions are taken by resource for tracking purpose.

For an embodiment, the microphone of at least one of the transceivers observes a sound signal emanating from within the structure.

For an embodiment, each transceiver has specific list of predefined command verses and associated actions. The actions may include controlling the light level, selecting particular scene, controlling other resources such as plug-load/AV/Shade etc, sending a specific message to controller for it to execute actions such as cry for help, fault reporting etc.

For at least some embodiments, the transceivers initiate action as appropriate for the command received. For at least some embodiments specific transceivers among the transceivers listening take action. For example, "light is not working" command makes the transceivers check the metering data and the one with faulty metering reading communicates that its associated light isn't working to the predefined mobile devices.

For at least some embodiments, all transceivers listening take action such as dimming light or going to a scene.

For at least some embodiments, all transceivers listening send a message to the controller, and the controller reconciles the messages and takes action. The action may include communicating specific action command to transceivers or communicating to mobile devices or communicating to building management systems or all of the above.

The described embodiments can be implemented using a light emitting diodes (LED) fixture that includes intelligence. The light fixture allows for intelligent control of the light of the light fixture. The light fixture can be networked with other light fixtures allowing for distributed control of multiple light fixtures. Additionally, embodiments of the light include network interfaces for additional or alternative light control.

Figure 10:
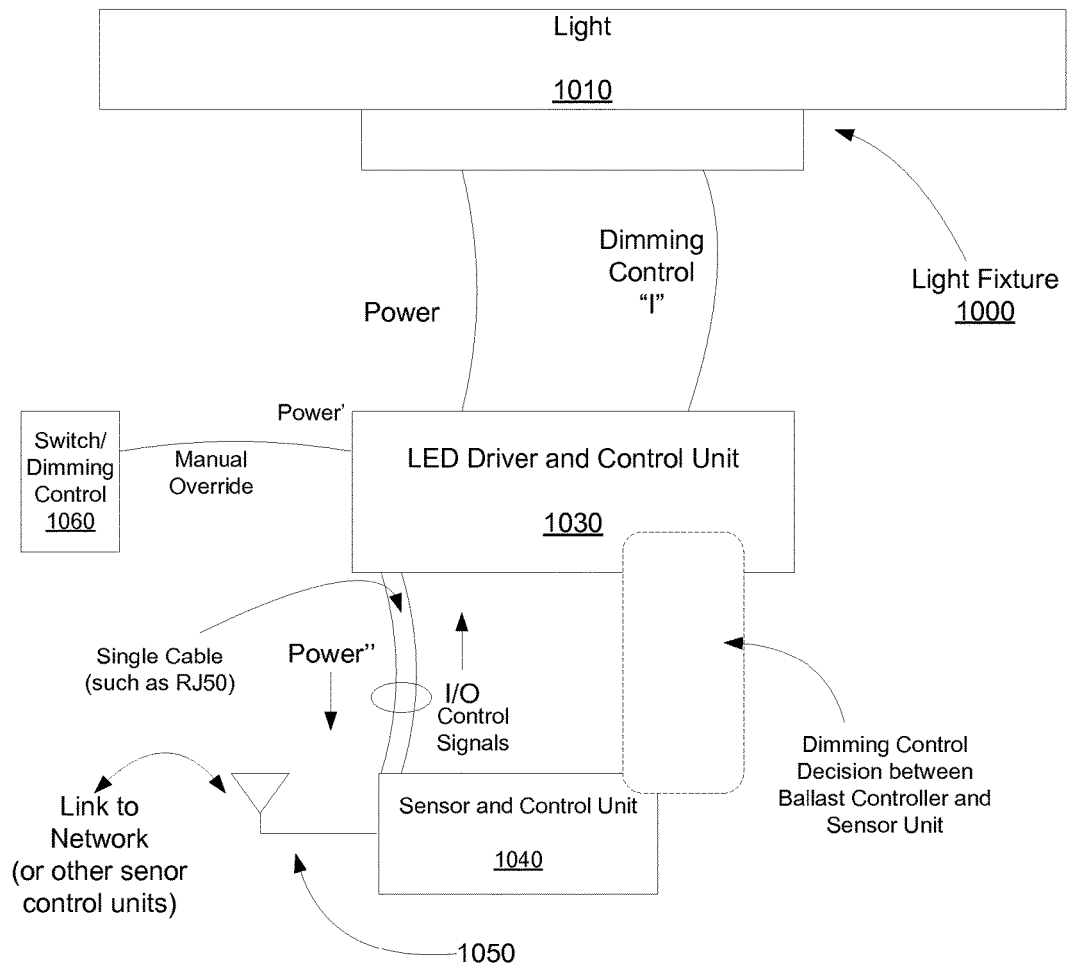
FIG. 10 shows an example of an LED fixture that includes intelligence, and is operable in conjunction with the described embodiments, according to an embodiment.

FIG. 10 shows an example of an LED fixture 1000 that includes intelligence, and is operable in conjunction with the described embodiments, according to an embodiment. For the embodiment of FIG. 10, the LED fixture 1000 that includes an LED Driver and Control Unit 1030 that is connected to an LED 1010, and provides a control signal (I) for controlling the intensity of light emitted from the LED 1010. Additionally, a sensor unit 1040 is connected to the LED Driver and Control Unit 1030.

For an embodiment, the LED Driver and Control Unit 1030 provides power to the sensor unit 1040, and the sensor unit 1040 provides control signals to the LED Driver and Control Unit 1030. This embodiment further includes a communications link being established between the sensor unit 1040 and a network or other devices. However, rather than being connected to a network, the sensor unit can connect to other sensor units and LED Driver and Control Units, allowing for decentralized control of a plurality of light fixtures. For a specific embodiment, the sensor unit 1040 includes at least one antenna 1050 and is wirelessly linked (through, for example, BLUETOOH® or ZIGBEE®) to the network, or other devices.

The wireless link can advantageously be located within the sensor unit 1040 rather than within the LED Driver and Control Unit 1030 because some configurations include the LED Driver and Control Unit 1030 being located within a common metal enclosure as the light fixture 1000. Locating the wireless link within the LED Driver and Control Unit 1030 could subject the wireless link to attenuation cause by the metal enclosure. By locating the antenna proximate to, but outside of the metal enclosure of the light fixture 1000, the quality of the wireless link can be sustained.

For an embodiment, the conductor providing power from the LED Driver and Control Unit 1030 to the sensor unit 1040, and the conductor(s) providing control signal(s) from the sensor unit 1040 to the LED Driver and Control Unit 1030 are located in a common cable. For an embodiment, the voltage provided to power the sensor unit 1040 is, for example, a low-power DC voltage. Being a low voltage, the sensor unit 1040 can be connected, and re-connected to the LED Driver and Control Unit 1030 by a lay-person (that is, a skilled, high-cost technician is not required for deploying the LED lighting system). That is, the voltage supply is low enough that, for example, replacement of the sensor unit is safe enough that an electrician is not required to make the replacement. For an embodiment, the sensor unit 1040 is attached to a ceiling proximate to the LED Driver and Control Unit 1030. The cable allows for easy installation of the retrofit LED Driver and Control Unit 1030 and retrofit sensor unit 1040. Exemplary cables include a flat cable with a RJ-45, RJ-50 like connector at either end. Flat cables can be desirable because that can easily slip easily between a guide-rail and a ceiling tile of a typical industrial ceiling, without requiring a hole in the tile.

Embodiments include all of the LED processing based on the sensed signals and any network input occurring all or partially within the sensor unit 1040. Other embodiments include varying amount of the driver control processing occurring within the LED Driver and Control Unit 1030. As indicated in FIG. 10, the dimming control decisions can be distributed between the LED Driver and Control Unit 1030 and the sensor unit 1040.

A manual switch, dimming control or timing dimming control unit 1060 can provide manual dimming control. Dimming control can be transferred from automated control provided by the LED Driver and Control Unit 1030 and the sensor unit 1040, to manual control provided by the dimming control unit 1060, by the dimming control unit 1060 communicating a transfer of control. The transfer of control can be communicated, for example, by the dimming control unit 1060 cycling power supplied by the dimming control unit 1060 according to a predetermined sequence. For example, the predetermined sequence can include manually power cycling by the dimming control unit 1060 three times within a predetermined amount of time. If the LED Driver and Control Unit 1030 and the sensor unit 1040 combination receives the power cycling according to the predetermined sequence (three cycles) then the manual over-ride is invoked, and the dimming control unit 1060 provides manual control until, for example, another sequence transfers dimming control back to the LED Driver and Control Unit 1030 and the sensor unit 1040 combination. Once in manual mode, the sensed signals no longer influence the dimming control.

An existing light fixture can be upgraded as shown in FIG. 10 without having to modify or update existing electrical wiring and switches. This is very desirable because the upgrade is easy, fast and inexpensive to implement. Once upgraded, many light fixtures can be managed with decentralized control. Decentralized control is desirable over centralized control because there is not a single point of failure. A purchaser of the retrofit kits can upgrade existing light fixtures over time.

The sensor and control unit 1040 includes sensors that sense conditions that are used for controlling the intensity of light emitted from the LED 1010. Such sensed signals include at least one of motion, light, temperature, images, etc. It is to be understood that this is not an exhaustive list of possible sensed conditions.

Figure 11:
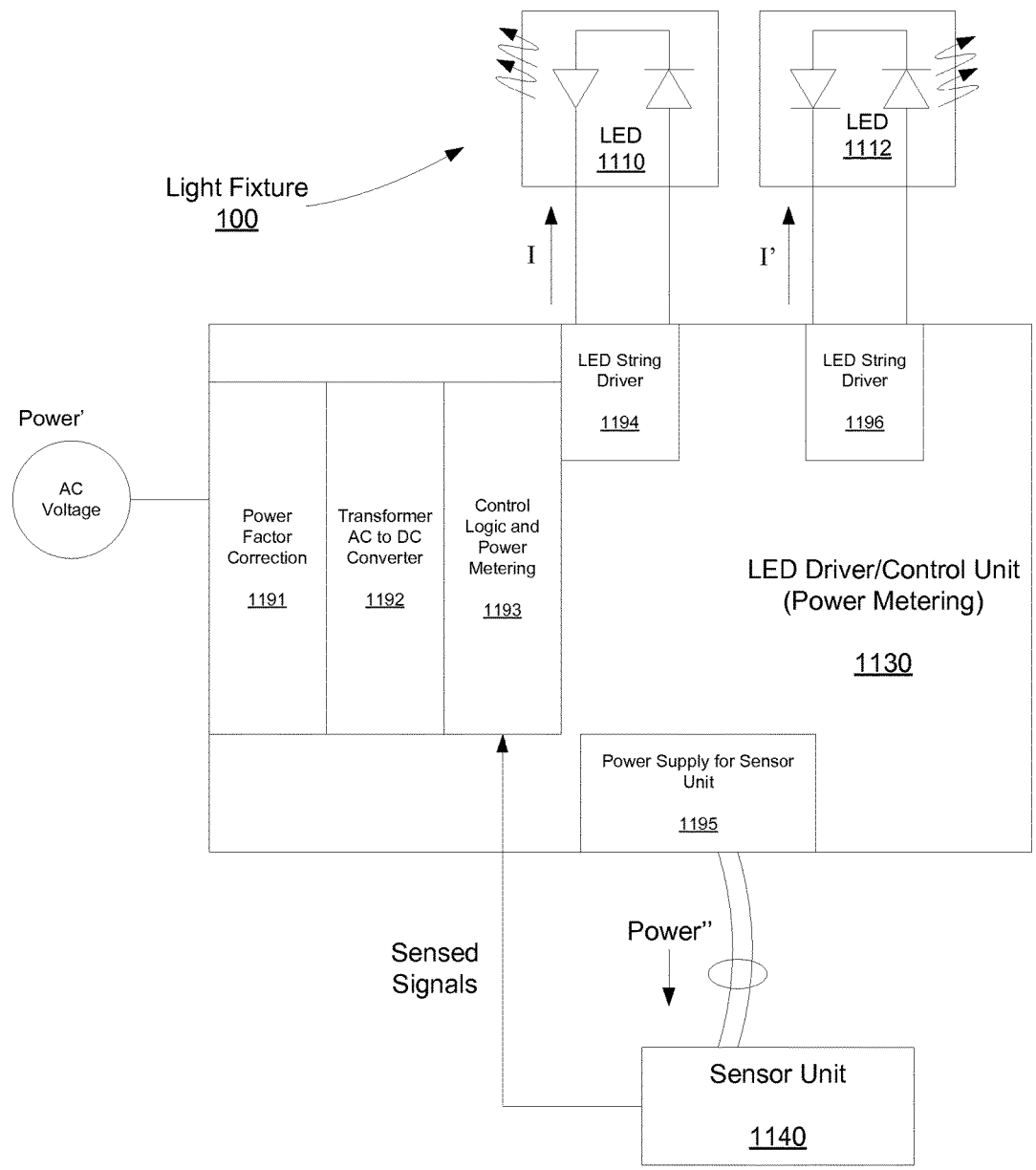
FIG. 11 shows another example of an LED fixture that includes intelligence according to another embodiment.

FIG. 11 shows another example of LED fixture that includes intelligence, according to another embodiment. As shown, LEDs 1110, 1112 are connected to the LED Driver and Control Unit 1130. Further, the sensor unit 1140 is connected to the LED Driver and Control Unit 1130.

FIG. 11 provides additional detail of an embodiment. More specifically, the LED Driver and Control Unit 1130 includes a power factor correction circuit 1191, an AC to DC transformer 1192, Sensor power circuit (Power Supply for Sensor Unit) 1195, and control logic and power metering circuitry 1193.

The power factor correction circuit 1191 receives AC voltage power, and adjusts the phase of the received AC voltage. The power factor correction circuit 1191 provides power factor correction.

The AC to DC transformer 1192 converts the received AC voltage to a DC voltage which is useable by the rest of the LED Driver and Control Unit 1130 and the sensor unit 1140. Sensor power circuit 1195 provides a low-power voltage to the sensor unit 1140.

The control logic and power metering circuitry 1193 amongst other things, receives sensed signals from the sensor unit 1140. For an embodiment, the control logic and power metering circuitry 1193 generates LED driver control signals for controlling an intensity of light of the LEDs 110, 112 based on the LED driver control signals.

As shown, LED string drivers 1194, 1196 receive the LED driver control signals and generate current drive signals (I, I') for controlling the intensity of light emitted from the LEDs 1110, 1112.

For an embodiment, the LED Driver and Control Unit 1130 also monitors the power consumed by the LED Driver and Control Unit 1130, the sensor unit 31140 and the LEDs 1110, 1112.

Figure 12:
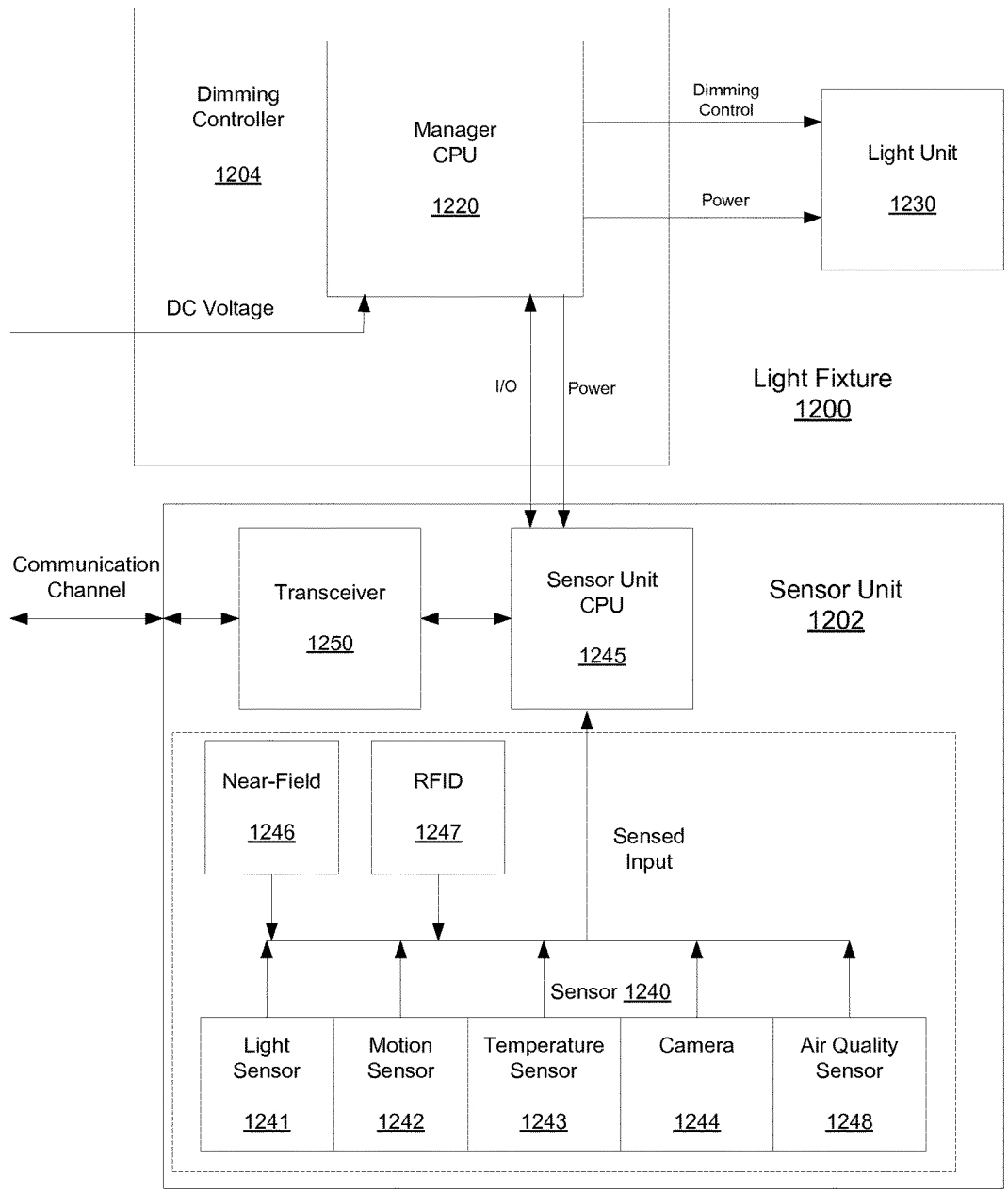
FIG. 12 shows a lighting fixture that includes a sensor and a transceiver, according to an embodiment.

FIG. 12 shows a lighting control sub-system 1200, according to an embodiment. The exemplary lighting control sub-system 1200 includes a sensor unit 1202 that is interfaced with a dimming controller 1204, which is interfaced with a light unit 1230. The dimming controller 1204 includes a controller (manager CPU) 1220 that is coupled to the light unit 1230, and to a sensor unit CPU 1245 of the sensor unit 1202. As shown, the sensor unit CPU 1245 is coupled to a transceiver 1250. For an embodiment, the communication interface includes at least one of the previously described transceivers (such as, transceiver 102). For an embodiment, the transceiver 1250 couples the sensor unit CPU 1245 to an external device, such as, the previously described controller 130.

The sensor unit 1202 additionally includes a sensor 1240 (which includes at least one of the previously described sensors, such as, sensors 111, 112). As indicated, the sensor 1240 can include one or more of a light sensor 1241, a motion sensor 1242, a temperature sensor 1243, a camera 1244, an air quality sensor 1248, a near field communication sensor 1246 and/or an RFID (radio frequency identification) sensor 1247. It is to be understood that this is not an exhaustive list of sensors. That is additional or alternate sensors can be utilized for lighting and/or environmental control of a structure that utilizes the lighting control sub-system 1200. The sensor 1240 is coupled to the sensor unit CPU 1245, and the sensor 1240 generates a sensed input.

According to at least some embodiments, the controllers (manager CPU 1220 and the sensor unit CPU 1245) are operative to control a light output of the light unit 1230 based at least in part on the sensed input, and communicate at least one of state or sensed information to the external device. Further, the controllers (manager CPU 1220 and the sensor unit CPU 1245) are operative to control a light output of the light unit 1230 based at least in part on control received from the external controller 130.

For at least some embodiments, the dimming controller 1204 receives the DC voltage and generates power control for the light unit 1230, and generates a low-voltage supply for the sensor unit 1202. As suggested, the dimming controller 1204 and the smart sensor unit 1202 interact to control a light output of the light unit 1230 based at least in part on the sensed input, and communicate at least one of state or sensed information to the external device. The dimming controller 1204 and the sensor unit 1202 can also receive state or control information from the external device (such as, the external controller 130), which can influence the control of the light output of the light unit 1230. While the manager CPU 1220 of the dimming controller 1204 and the sensor unit CPU 1245 of the sensor unit 1202 are shown as separate controllers, it is to be understood that for at least some embodiments the two separate controllers (CPUs) 1220, 1245 can be implemented as single controller or CPU.

For at least some embodiments, the transceiver 1250 provides a wireless link to external devices (for example, the external controller and/or other lighting fixtures).

Figure 13:
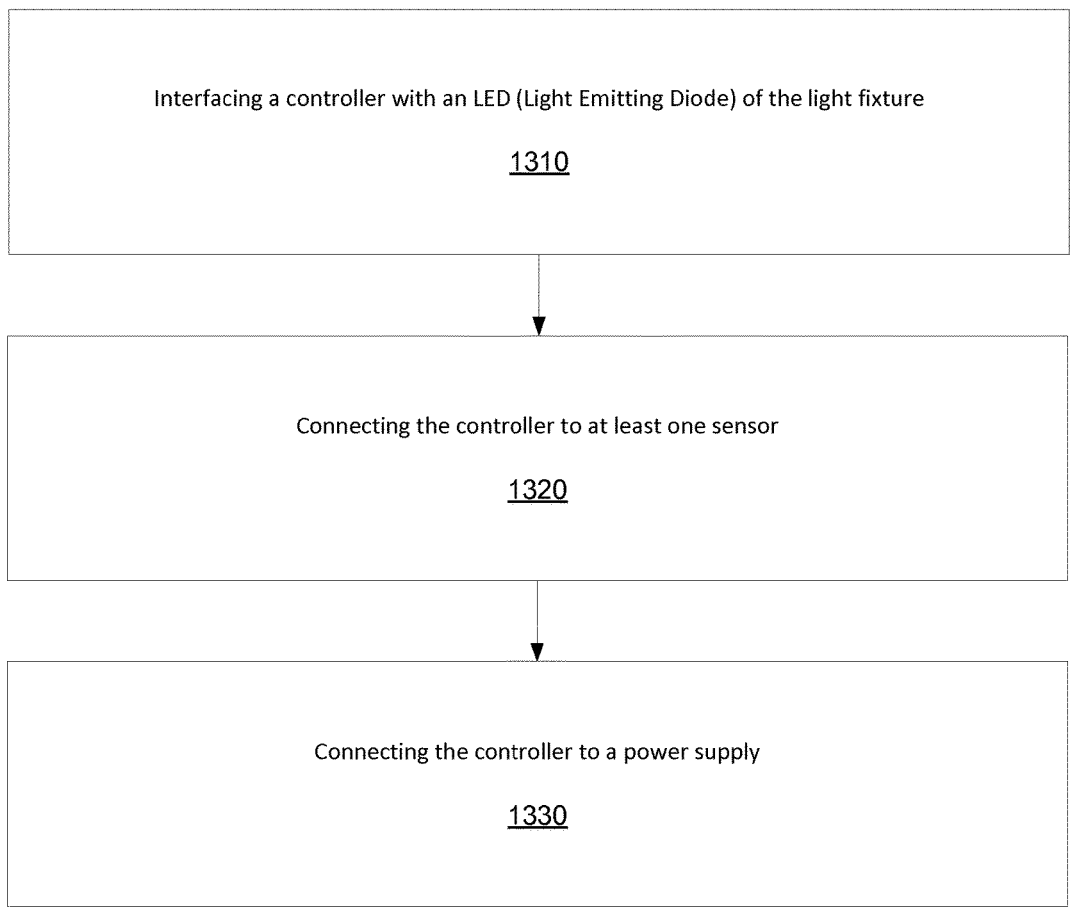
FIG. 13 is a flow chart that includes steps of an example of a method of operation of an LED fixture, according to an embodiment.

FIG. 13 is a flow chart that includes steps of an example of a method of operating a light fixture. A first step 1310 includes interfacing a controller with a light emitting diode (LED) associated with the light fixture. A second step 1320 includes connecting the controller to at least one sensor, wherein connecting the controller to at least one sensor comprises attaching an external electrically conductive line between at least one external sensor and the controller, wherein the external electrically conductive line provides power to the at least one external sensor from the controller. A third step 1330 includes connecting the controller to a power source.

At least one embodiment further includes affixing the at least one external sensor proximate to the light fixture. For at least one embodiment, the external electrically conductive line provides at least one of sensor and control information from the at least one external sensor to the retrofit controller.

For at least one embodiment, the at least one external sensor includes a second controller, and the at least one external sensor being wirelessly connected to a network. For at least one embodiment, the at least one external sensor provides dimming control information to the controller based on at least one of sensed information and control information received from the network.

For at least one embodiment, the controller receives sensed information from the at least one sensor, and adaptively controls dimming of the LED based on the sensed information.

Although specific embodiments have been described and illustrated, the described embodiments are not to be limited to the specific forms or arrangements of parts so described and illustrated. The embodiments are limited only by the appended claims.

What is claimed:

1. A distributed network of a structure, comprising:
   a plurality of wireless transceivers distributed about the structure;
   a plurality of sensors distributed about the structure;
   a controller electronically connected to the plurality of wireless transceivers, and the plurality of sensors;
   wherein the plurality of wireless transceivers is operative to:
   transmit time-based tokens downstream to a mobile device through a low-power first network, wherein the low-power first network includes the plurality of wireless transceivers, wherein the time-based tokens include at least a time stamp and wherein each time stamp is valid for a period of time after the time stamp has been generated;
   wherein at least some of the time-based tokens are received by the mobile device through the low-power first network, and wherein the mobile device generates modified time-based tokens that include identification information of the mobile device that has been appended to each of the received time-base tokens and wherein the mobile device transmits the modified time-based tokens upstream to the controller through a second network;
   wherein the controller is operative to:
   receive at least some of the modified time-based tokens from the mobile device through the second network; and
   perform location-based intelligence based on at least the identification information and time stamps of the time-based tokens.

2. The distributed network of claim 1, wherein the controller operative to perform location-based intelligence based on the identification information and the time-based tokens includes the controller being operative to:
   identify a location of the mobile device based on transmit times of the time-based tokens, wherein the transmit times are determined from the time stamps of the time-based tokens;
   determine that the mobile device is proximate to a door of the structure based on the identified location and a known location of the door;
   send a command which opens the door after determining the mobile device is proximate to the door.

3. The distributed network of claim 1, wherein the controller operative to perform location-based intelligence based on the identification information and the time-based tokens includes the controller being operative to:
   identify a location of the mobile device based on transmit times of the time-based tokens, wherein the transmit times are determined from the time stamps of the time-based tokens;
   provide access to a room of the structure to a user of the mobile device based on the identified location and known locations about the structure.

4. The distributed network of claim 1, wherein the controller operative to perform location-based intelligence based on the identification information and the time-based tokens includes the controller being operative to:
   identify a location of the mobile device based on transmit times of the time-based tokens, wherein the transmit times are determined from the time stamps of the time-based tokens;
   track access and activity of a user of the mobile device based on the identified location and known locations about the structure.

5. The distributed network of claim 1, wherein the controller is further operative to:
   identify a location of the mobile device based on a-transmit times of the time-based tokens, wherein the transmit times are determined from the time stamps of the time-based tokens;
   provide the mobile device access to internet-connected devices based at least in part on the location of the mobile device.

6. The distributed network of claim 1, wherein the controller is further operative to:
   identify a location of the mobile device based on transmit times of the time-based tokens, wherein the transmit times are determined from the time stamps of the time-based tokens;
   provide the mobile device with status and access to resources of the structure based on the identified location of the mobile device.

7. The distributed network of claim 1, further comprising:
a plurality of asset tags distributed about the structure;
wherein the controller is further operative to:
receive modified time-based tokens from at least one of the plurality of asset tags through the second network, wherein the modified time-based tokens include identification information of the at least one of the plurality of asset tags that has been appended to the time-base tokens;
identify a location of the at least one of the plurality of asset tags based on transmit times of the time-based tokens, wherein the transmit times are determined from the time stamps of the time-based tokens;
determine that the at least one of the plurality of asset tags is authorized to be in the identified location based on the identified location and known authorized and non-authorized locations about the structure; and
perform any require actions based on the determination of whether the at least one of the plurality of asset tags is authorized to be in the identified location.

8. The distributed network of claim 7, wherein the controller is further operative to track the at least one of the plurality of asset tags through the structure, and perform required action based on the tracking.

9. The distribution network of claim 1, wherein the controller is further operative to:
download resources available to the mobile device based on the location of the mobile device; and
facilitate control of the resources.

10. The distribution network of claim 1, wherein the controller is further operative to:
identify locations of a plurality of mobile devices based on transmit times of time-based tokens;
download to the mobile device, locations of the plurality of mobile devices.

11. The distribution network of claim 10, wherein the controller is further operative to enable messaging service between the mobile device and the plurality of mobile devices based at least in part on the location of the mobile device and a location of each of the plurality of mobile devices.

12. The distribution network of claim 10, wherein the controller is further operative to identify whether one or more of the plurality of mobile devices is within proximity of an emergency situation based on a location of each of the plurality of mobile devices and transmit through the plurality of transceivers a status of the emergency situation and advice for action to be taken.

13. A distributed network of a structure, comprising:
a plurality of wireless transceivers distributed about the structure;
a plurality of sensors distributed about the structure;
at least one controller within one or more of the plurality of wireless transceivers electronically connected to at least a subset the plurality of wireless transceivers, and the plurality of sensors;
wherein the plurality of transceivers is operative to:
transmit time-based tokens through a low-power first network, wherein the low-power first network includes the plurality of wireless transceivers, wherein the time-based tokens include at least a time stamp and wherein each time stamp is valid for a period of time after the time stamp has been generated;
wherein at least some of the time-based tokens are received by a mobile device through the low-power first network, and wherein the mobile device generates modified time-based tokens that include identification information of the mobile device that has been appended to each of the received time-base tokens and wherein the mobile device transmits the modified time-based tokens upstream to the controller through a second network;
wherein the at least one controller is operative to:
receive at least some of the modified time-based tokens from the mobile device through a second network; and
perform location-based intelligence based on at least the identification information and time stamps of the time-based tokens, and based on proximity of the mobile device to transceivers of the plurality of transceivers in which a communication link is maintained.

14. The distributed network of claim 13, further comprising:
a plurality of asset tags distributed about the structure;
wherein the at least one controller of the plurality of wireless transceivers is electronically connected to the plurality of asset tags distributed about the structure; and
wherein the at least one controller is further operative to:
receive modified time-based tokens from at least one of the plurality of asset tags through the second network, wherein the modified time-based tokens include identification information of the at least one of the plurality of asset tags that has been appended to the time-base tokens; and
perform location-based intelligence based on the identification information and the time-based tokens.

* * * * *